Sept. 2, 1930.  J. E. MILLER  1,774,656
ROLLER ATTACHMENT FOR VEHICLES
Filed Aug. 1, 1927
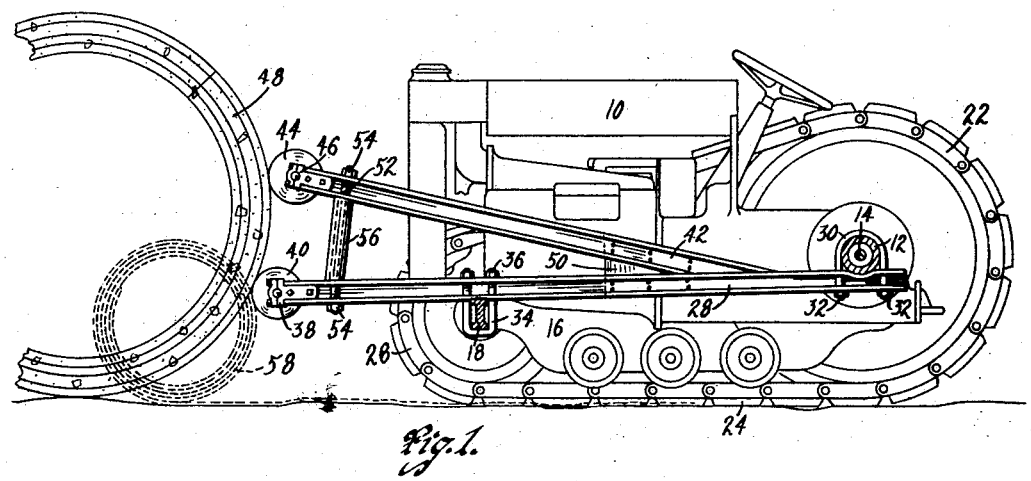
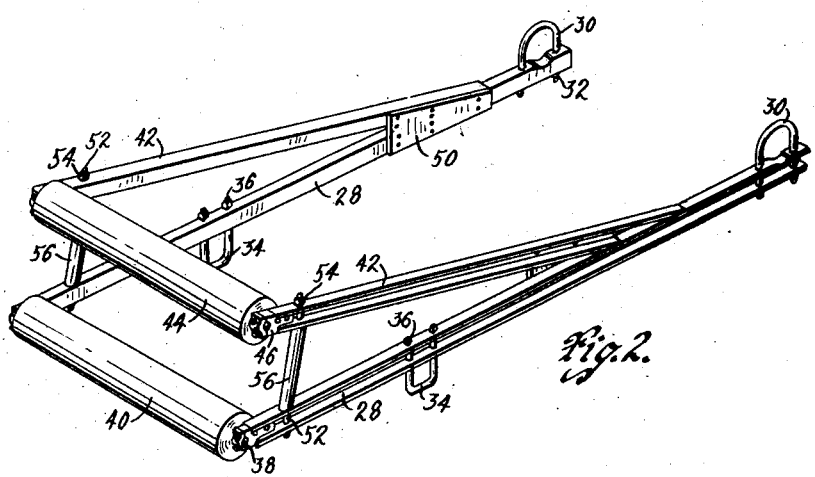

Patented Sept. 2, 1930

1,774,656

UNITED STATES PATENT OFFICE

JOSEPH E. MILLER, OF FORT WAYNE, INDIANA

ROLLER ATTACHMENT FOR VEHICLES

Application filed August 1, 1927. Serial No. 209,784.

The object of my invention is to provide an attachment adapted to be secured to tractors or other vehicles for the purpose of engaging objects such as large concrete pipes for the purpose of moving them from one place to another, the parts of the attachment being of simple, durable, and comparatively inexpensive construction.

Still another object of my invention is to provide my attachment in the form of a frame with rollers journaled on the forward end thereof so that they are free to turn as constrained by the object which they engage during the use of my device for moving objects.

Still a further object is to provide a plurality of rollers so that both small and large objects can be equally well handled by the use of my attachment.

Still a further object is to provide a way of attaching the device to a tractor or other vehicle so that it is rigidly mounted relative thereto and can be used as a thrust member for moving an object when the tractor is moved to engage the object and move it.

With these and other objects in view, my invention consists in the construction, arrangement and combination of the various parts of my roller attachment whereby the objects contemplated are attained, as hereinafter more fully set forth, pointed out in my claims, and illustrated in the accompanying drawings, in which:

Figure 1 is a side elevation of a tractor of the caterpillar type with the near side caterpillar removed and illustrating my attachment secured to the frame thereof; and Figure 2 is a perspective view of the attachment itself.

On the accompanying drawings I have used the reference numeral 10 to indicate generally a tractor. The tractor 10 is provided with rear axle housings 12 for housing the rear axle shaft 14.

I have illustrated an ordinary tractor having a caterpillar attachment in which the caterpillar frame is indicated at 16 and has a front cross member 18 which in this instance is pivoted to the front axle support of the tractor 10. The driving sprockets of the caterpillar attachment are indicated at 22. The caterpillar tread is indicated at 24 and the front caterpillar sprocket at 26. It will, of course, be understood that my attachment can be secured to an ordinary tractor or to one with a caterpillar attachment or to any other type of vehicle, either motor driven or pulled by horses, and the attachment will function in the same manner regardless of what type of vehicle it is secured to.

My attachment itself comprises a pair of frame members 28 which may be suitably secured to the frame of the tractor or vehicle to which the device is applied. In the present instance I have utilized U bolts 30 for securing the rear ends of the frame 28 to the axle housings 12. The U bolts 30 merely extend over the upper sides of the housings 12 and through the frame members 28. Nuts 32 are then positioned on the lower ends of the U bolts for clamping the frame members 28 against the housings.

For securing the front ends of the frame 28 to the tractor I have shown them as resting on the cross frame member 18 of the caterpillar. U bolts 34 and nuts 36 are used for securely clamping the frame members 28 to the cross member 18.

Journaled in bearings 38 which are secured to the front ends of the frame members 28 is a roller 40. The roller 40 is positioned just ahead of the foremost extending extremity of the tractor and is free to rotate with relation to the bearings 38. It may here be mentioned that means other than the U-bolts illustrated can be provided for attaching the frame members 28 to a vehicle and the roller 40 may be positioned either ahead of or behind the tractor so that it can be used when travelling forwardly or rearwardly depending on which way is most convenient for the particular class of work being done.

An auxiliary frame comprising frame members 42 is provided for rotatably supporting a second roller 44. The roller 44 is mounted above the roller 40 and is journalled in bearings 46 secured to the forward ends of the frame members 42. The roller 44 is provided for engaging large objects such as a concrete pipe 48 as shown in Figure 1 of the drawings and in full lines. It will be obvious that a large pipe such as the one 48 may have a tendency to go over a roller as low as the one 40 unless this second roller is provided.

I have illustrated the auxiliary frame members 42 as being connected to the main frame members 28 in the following described manner.

The rear ends of the members 42 are cut at an angle and secured to the members 28 by gusset plates 50. A bolt 52 extends through the members 28 and 42 and receives nuts 54 on its ends. A spacing sleeve 56 is provided on the bolt 52 between the frame members 28 and 42.

It will be understood, of course, that the frame work 28 and 42 may be of any suitable material other than the channel iron which I have illustrated and the rollers 40 and 44 may be of wood or metal or, in some cases, rubber, depending on which material is best suited to the class of work being handled by my attachment. In Figure 1, I have illustrated the roller 40 as engaging a roll of wire 58, shown in dotted lines for the purpose of unrolling it. In doing this the tractor runs over the wire and unrolls it as it travels along the ground. The conditions in this event, of course, would have to be favorable for preventing damage being done to the wire by the tractor. Reinforcing rods are often woven into a net work and then shipped in the form of rolls and it is rather difficult to unroll them by other methods due to the stiffness of the material. However, I have found that my device works satisfactorily in unrolling such rolls of reinforcing rods and helping to make them lie flat after the tractor has passed over them.

My device can also be made in the form of one frame pivoted at the rear end and the front end being adjustable up and down for accommodating pipes of different sizes instead of using a plurality of rollers. All kinds of heavy pipes such as concrete, cast iron or sheet steel can be readily and conveniently handled by my attachment.

Although I have illustrated one form in which my device can be made various changes in construction and arrangement of the parts thereof may be made without departing from the real spirit and purpose of my invention and it is my intention to cover by my claims, any modified forms of structure or use of mechanical equivalents, which may be reasonably included within their scope.

I claim as my invention:

1. For use with a self-propelled vehicle, a moving attachment comprising a frame having side arms adapted to be attached to the rear and front axles of such vehicle, and a roller journaled on the outer end of said frame and positioned ahead of said vehicle, an auxiliary frame having side arms connected at their rear ends to the first mentioned side arms, extending forward from the point of connection and having a second roller journaled on the outer end thereof and positioned above said first roller, said frames being spread apart adjacent said rollers and spacer members having ends secured to said frames adjacent the rollers journaled thereon.

2. A device of the character described, comprising a frame adapted to be rigidly supported on the front of a tractor, a transversely elongated idler roller supported on said frame projecting forwardly therefrom for engaging and moving tile or the like, a second transversely elongated idler roller supported on said frame above and rearwardly of the first idler roller.

3. In a device of the character described, the combination of a tractor with a frame, means for rigidly mounting said frame on the frame of the tractor, a transversely elongated idler roller mounted on said frame and projecting forwardly therefrom, a second transversely elongated idler roller supported on said frame and projecting forwardly therefrom, said rollers being adapted to engage and move tile or the like.

JOSEPH E. MILLER.